United States Patent
Wilder et al.

(10) Patent No.: US 12,252,125 B2
(45) Date of Patent: Mar. 18, 2025

(54) DRIVER-SELECTABLE VEHICLE LAUNCH TORQUE CURVES AND OPEN-LOOP ENGINE TORQUE CONTROL

(71) Applicants: James M Wilder, Farmington Hills, MI (US); Christopher E Pueppke, Clarkston, MI (US); Jeremy J Anker, Lake Orion, MI (US)

(72) Inventors: James M Wilder, Farmington Hills, MI (US); Christopher E Pueppke, Clarkston, MI (US); Jeremy J Anker, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 245 days.

(21) Appl. No.: 16/901,226

(22) Filed: Jun. 15, 2020

(65) Prior Publication Data
US 2021/0387624 A1  Dec. 16, 2021

(51) Int. Cl.
*B60W 30/18* (2012.01)
*B60W 50/14* (2020.01)

(52) U.S. Cl.
CPC ...... *B60W 30/18027* (2013.01); *B60W 30/18109* (2013.01); *B60W 50/14* (2013.01);
(Continued)

(58) Field of Classification Search
CPC ........... B60W 30/18027; B60W 50/14; B60W 30/18109; B60W 2540/10; B60W 2520/26; B60W 2050/146
See application file for complete search history.

(56) References Cited

U.S. PATENT DOCUMENTS 8,175,785 B2   5/2012   Turski et al.
8,473,134 B1 *  6/2013   Janczak .................. B60L 15/20
                                                 701/22
(Continued)

FOREIGN PATENT DOCUMENTS

JP   4864656 B2 *  2/2012

OTHER PUBLICATIONS

Traction and Stability control, can you turn yours off?, Kia Stinger Forum, Jan. 17, 2019 (Year: 2019).*
(Continued)

*Primary Examiner* — Elaine Gort
*Assistant Examiner* — Chanmin Park
(74) *Attorney, Agent, or Firm* — Jeremy J. Klobucar

(57) ABSTRACT

A launch control technique for a vehicle having a torque generating system comprises displaying, via a user interface, information relating to a set of launch torque curves, each launch torque curve defining how the torque generating system is to generate drive torque during a period, receiving, via the user interface, a driver-selection of one of the set of launch torque curves to obtain a driver-selected launch torque curve, detecting a set of launch conditions comprising one or more vehicle operating conditions indicative of a launch of the vehicle, detecting a launch request in response to an accelerator pedal of the vehicle being depressed, and controlling the launch of the vehicle by performing open-loop control of the drive torque generated by the torque generating system according to the driver-selected launch torque curve and irrespective of wheel slip of the vehicle.

20 Claims, 3 Drawing Sheets

(52) U.S. Cl.
CPC ... *B60W 2050/146* (2013.01); *B60W 2520/26* (2013.01); *B60W 2540/10* (2013.01)

(56) References Cited

U.S. PATENT DOCUMENTS

| | | |
|---|---|---|
| 9,731,721 B1 | 8/2017 | Wilder et al. |
| 9,855,813 B2 | 1/2018 | Mohamed |
| 9,873,431 B2 | 1/2018 | Sowards et al. |
| 10,458,351 B2 | 10/2019 | Wilder et al. |
| 2006/0205563 A1* | 9/2006 | Bai ................ B60W 30/18027 477/180 |
| 2010/0010710 A1* | 1/2010 | Kopp .................... B60T 8/1764 701/73 |
| 2010/0161188 A1* | 6/2010 | Turski .................... B60T 8/175 701/67 |
| 2016/0061319 A1* | 3/2016 | Fodor ............. B60W 30/18027 701/60 |
| 2018/0187619 A1* | 7/2018 | McLemore ............. F02D 41/10 |
| 2018/0354493 A1* | 12/2018 | Johri ............... B60W 30/18027 |
| 2019/0126939 A1* | 5/2019 | Zhao .................. B60W 50/085 |
| 2019/0248370 A1* | 8/2019 | Cunningham .. B60W 30/18018 |
| 2020/0130452 A1* | 4/2020 | Rothwell ........... B60G 17/0165 |
| 2024/0253633 A1* | 8/2024 | Prucka ............ B60W 30/18027 |

OTHER PUBLICATIONS

Schiffer et al., Improving longitudinal dynamics of conventional vehicles in comparison to electrified vehicles to meet customer behavior (Year: 2017).*

Donikian, Design and Control of an Autonomous High Speed 1/4 Mile Vehicle (Year: 2020).*

* cited by examiner

DRIVER-SELECTABLE VEHICLE LAUNCH TORQUE CURVES AND OPEN-LOOP ENGINE TORQUE CONTROL

FIELD

The present application generally relates to vehicle launch control systems and, more particularly, to driver-selectable vehicle launch torque curves and open-loop engine torque control irrespective of wheel slip.

BACKGROUND

Vehicle launch control to achieve maximum performance (e.g., minimal or optimal drag racing times) is difficult, particularly in vehicles having high performance engines. This is because there are potentially high levels of wheel/tire slip and large engine torque variations (as well as noise/vibration/harshness, or NVH) in vehicles equipped with these types of engines, particularly in response to the driver modulating the position of the accelerator pedal in an attempt to improve performance. Conventional electronic stability control (ESC) systems attempt to control engine torque during vehicle launches in a feedback-based manner, such as based on a desired wheel slip profile. Feedback-based approaches, however, can have delays because they require repeated back/forth engine torque alterations based on the feedback parameters and desired setpoints. These feedback-based approaches are therefore not ideal for drag racing or similar track racing scenarios. Accordingly, while conventional feedback-based vehicle launch control systems do work well for their intended purpose, there exists an opportunity for improvement in the relevant art.

SUMMARY

According to one example aspect of the invention, a launch control system for a vehicle having a torque generating system is presented. In one exemplary implementation, the launch control system comprises: a user interface configured to display information relating to a set of launch torque curves, each launch torque curve defining how the torque generating system is to generate drive torque during a period and receive a driver-selection of one of the set of launch torque curves to obtain a driver-selected launch torque curve, and a controller configured to detect a set of launch conditions comprising one or more vehicle operating conditions indicative of a launch of the vehicle, detect a launch request in response to an accelerator pedal of the vehicle being depressed to an accelerator pedal position threshold, and after receiving the receiving the driver-selected launch torque curve and in response to detecting the set of launch conditions and the launch request, control the launch of the vehicle by performing open-loop control of the drive torque generated by the torque generating system according to the driver-selected launch torque curve and irrespective of wheel slip of the vehicle.

In some implementations, the controller is configured to perform the open-loop control of the drive torque generated by the torque generating system according to the driver-selected launch torque curve and irrespective of any feedback relative to a driveline of the vehicle. In some implementations, the controller is configured to perform the open-loop control of the drive torque generated by the torque generating system according to the driver-selected launch torque curve and without any driver modulation of the accelerator pedal.

In some implementations, the set of driver-selectable launch torque curves comprises a plurality of predetermined launch torque curves. In some implementations, the set of driver-selectable launch torque curves comprises at least one driver-generated or driver-modified launch torque curve.

In some implementations the set of launch conditions comprises a speed of the vehicle being less than a threshold and a brake pedal of the vehicle being depressed to a first brake pedal position threshold or a clutch pedal of the vehicle being depressed to a clutch pedal position threshold. In some implementations, the launch request further comprises the brake pedal being released to a second brake pedal position threshold.

In some implementations, the set of launch conditions comprises a speed of the vehicle being less than a threshold and a transmission braking feature of the vehicle being active. In some implementations, the user interface is a touch display of an infotainment system of the vehicle.

According to another example aspect of the invention, a launch control method for a vehicle having a torque generating system is presented. In one exemplary implementation, the launch control method comprises: commanding, by a controller of the vehicle, a user interface of the vehicle to display information relating to a set of launch torque curves, each launch torque curve defining how the torque generating system is to generate drive torque during a period, receiving, by the controller and via the user interface, a driver-selection of one of the set of launch torque curves to obtain a driver-selected launch torque curve, detecting, by the controller, a set of launch conditions comprising one or more vehicle operating conditions indicative of a launch of the vehicle, detecting, by the controller, a launch request in response to an accelerator pedal of the vehicle being depressed to an accelerator pedal position threshold, and after receiving the driver-selected launch torque curve and in response to detecting the set of launch conditions and the launch request, controlling, by the controller, the launch of the vehicle by performing open-loop control of the drive torque generated by the torque generating system according to the driver-selected launch torque curve and irrespective of wheel slip of the vehicle.

In some implementations, the performing of the open-loop control of the drive torque generated by the torque generating system according to the driver-selected launch torque curve is irrespective of any feedback relative to a driveline of the vehicle. In some implementations, the performing of the open-loop control of the drive torque generated by the torque generating system according to the driver-selected launch torque curve is without any driver modulation of the accelerator pedal.

In some implementations, the set of driver-selectable launch torque curves comprises a plurality of predetermined launch torque curves. In some implementations, the set of driver-selectable launch torque curves comprises at least one driver-generated or driver-modified launch torque curve.

In some implementations, the set of launch conditions comprises a speed of the vehicle being less than a threshold and a brake pedal of the vehicle being depressed to a first brake pedal position threshold or a clutch pedal being depressed to a clutch pedal position threshold. In some implementations, the launch request further comprises the brake pedal being released to a second brake pedal position threshold.

In some implementations, the set of launch conditions comprises a speed of the vehicle being less than a threshold and a transmission braking feature of a transmission of the vehicle being active. In some implementations, the user interface is a touch display of an infotainment system of the vehicle.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, conventional feedback-based vehicle launch control systems are not ideal for drag racing or similar track scenarios. These conventional systems control engine torque during vehicle launches based on one or more feedback parameters, such as a desired wheel slip profile. For example, these desired wheel slip profiles could be based on road or temperature conditions and could include different profiles for snow/ice, rain, dry, and race/track conditions. Because these feedback-based approaches can have slight delays, there are not ideal for, for example, a drag racing scenario where an entire vehicle run could last less than ten seconds and a launch portion (e.g., through $1^{st}$ gear or through $1^{st}$ gear and at least part of one or more additional gears) could last only a few seconds. For example, provided there is sufficient traction, a feedback-based approach delay could be on the magnitude of hundredths of a second, which could be critical in a drag racing scenario. Accordingly, improved launch control systems and methods are presented that perform open-loop engine torque control based on a driver-selected launch torque curve and irrespective of wheel slip. This open-loop engine torque control approach removes any feedback from the engine torque control, which instead follows the driver-selected launch torque curve until one or more exit conditions occur. Potential benefits include improved drag/track performance and less required driver action during the vehicle launch.

Figure 1:
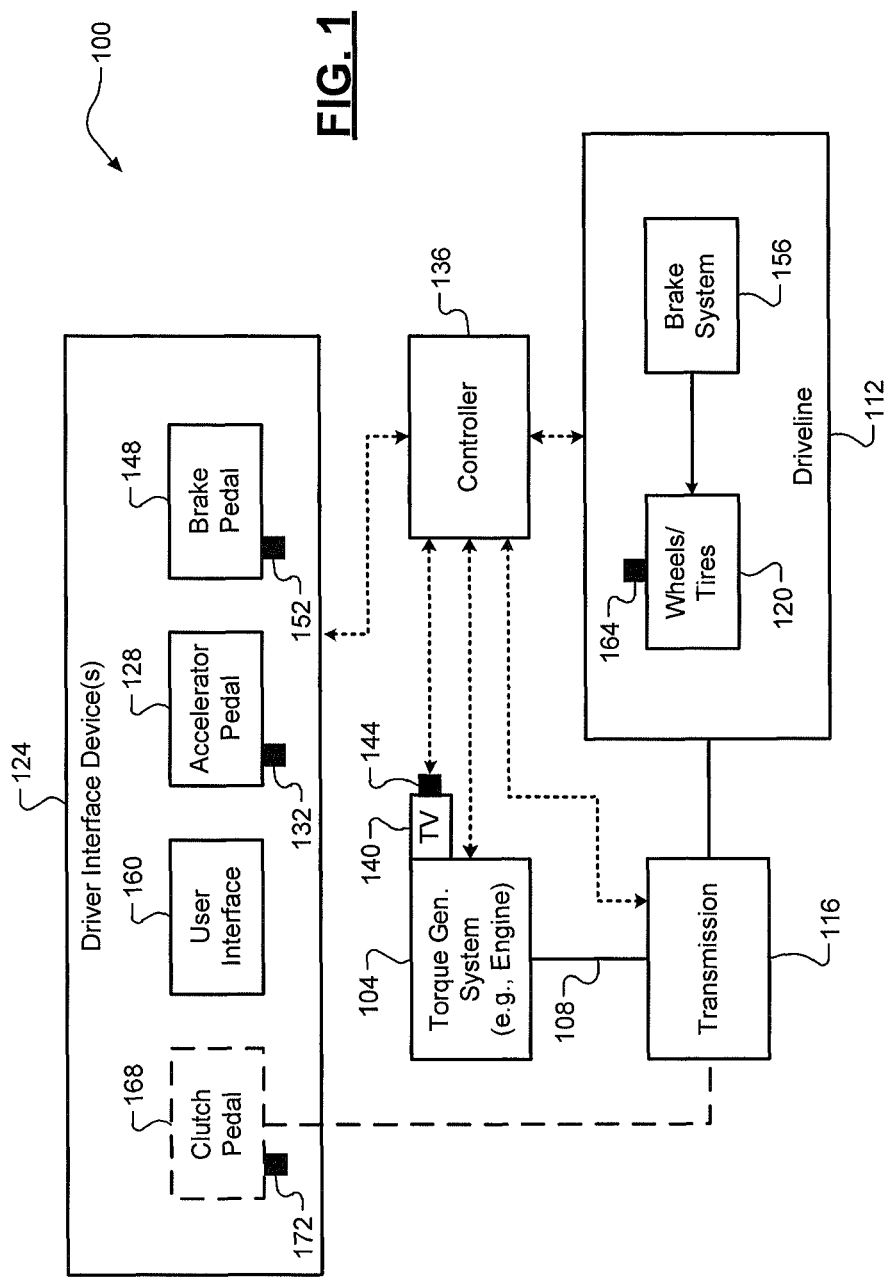
FIG. 1 is a functional block diagram of an example vehicle having a launch control system that utilizes driver-selectable launch torque curves for open-loop engine torque control irrespective of wheel slip according to the principles of the present disclosure.

Referring now to FIG. 1, a functional block diagram of a vehicle 100 having an example launch control system according to the principles of the present disclosure is illustrated. The vehicle 100 comprises a torque generating system 104 (an internal combustion engine, an electric motor, combinations thereof, etc.) that is configured to generate drive torque at an output shaft 108. More specifically, while the torque generating system 104 is hereinafter referred to as engine 104, it will be appreciated that any suitable torque generating system configuration could be utilized (electric motor only, engine+electric motor(s), engine/motor(s) with forced-induction, such as turbochargers or superchargers, etc.). As previously discussed, in one exemplary implementation the engine 104 is capable of producing very large amounts of drive torque. The drive torque at the output shaft 108 is transferred to a driveline 112 of vehicle 100 via a transmission 116. In one exemplary implementation, the transmission 116 is an automatic transmission that performs gear shifting without driver intervention, which could be ideal for maximum performance. It will be appreciated, however, that the techniques of the present disclosure are not limited to automatic transmissions and could also be applicable to manual transmissions (see, e.g., optional clutch pedal 168 and optional clutch pedal position sensor 172).

The driveline 112 comprises a system of driveline components (axles, differentials, etc.) that transfer the drive torque to wheels/tires 120 of the vehicle 100. The drive torque at the wheels/tires 120 of the vehicle 100 causes friction with a ground surface to thereby propel the vehicle 100. The amount of drive torque generated by the engine 104 could be based on driver input via one or more driver input device(s) 124, such as an accelerator pedal 128 that is depressed by the driver and its position/depression is measured by an accelerator pedal position sensor 132. A controller 136 receives this accelerator pedal position signal and in turn controls opening/closing of a throttle valve (TV) 140 of the engine 104 to control airflow into the engine 104. A position of the throttle valve 140 is measured by a throttle position sensor (TPS) 144 and fed back to the controller 136. The controller 136 is also configured to control fueling/ignition (e.g., spark) of the engine 104, in conjunction with controlling the airflow as described above, to control the amount of torque generated by the engine 104. In some implementations, such as an automatic transmission configuration of the transmission 116, the controller 136 or a separate transmission controller is also configured to control gear shifting of the transmission 116.

In one exemplary implementation, the controller 136 is configured to control one or more clutches (not shown) of the transmission 116 to lockup the transmission 116 and thereby prevent powerflow from the engine 104 to the driveline 112, which is also described herein as a transmission braking or "transbrake" feature. This transbrake feature could be utilized in conjunction with the vehicle launch control systems and methods of the present disclosure. The driver interface device(s) 124 could also include a brake pedal 148 that is configured to be depressed by the driver and to have its position/depression measured by a brake pedal position sensor 152. The controller 136 receives this brake pedal position signal and in turn controls a brake force applied at the driveline 112 (e.g., to the wheels/tires 120) by a brake system 156. The driver interface device(s) 124 could also include a user interface 160 (e.g., touch display of an infotainment system) that is configured to display information to and receive input from the driver. While the vehicle 100 is illustrated as having wheel/tire speed sensors 164 that are configured to measure wheel/tire slip, it will be appreciated that these sensors are only used during normal driving modes/conditions and are not utilized during the open-loop engine torque control during vehicle launches as described herein.

Figure 2:
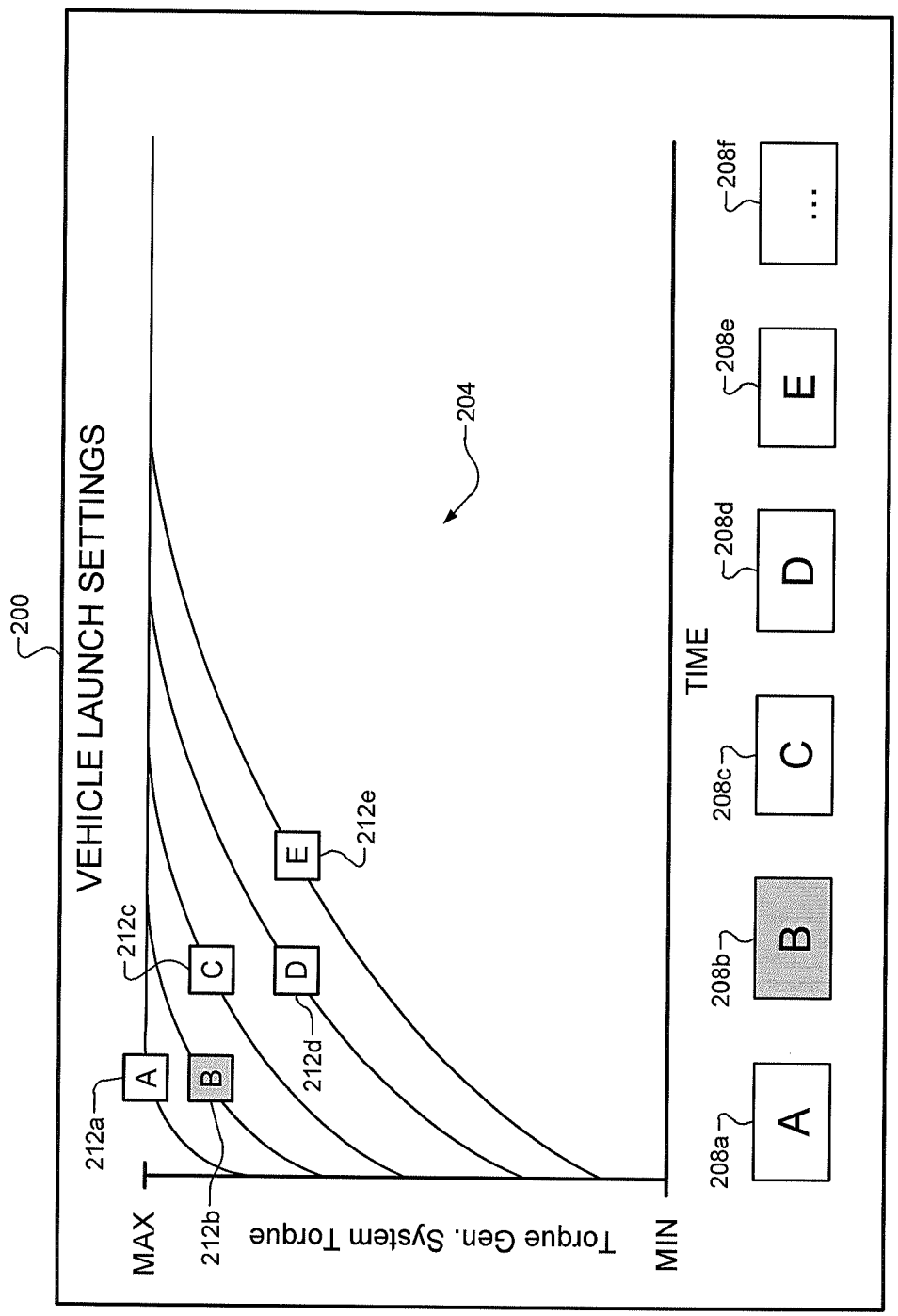
FIG. 2 is an example user interface displaying driver-selectable launch torque curves and a driver-selected launch torque curve according to the principles of the present disclosure.

Referring now to FIG. 2 and with continued reference to FIG. 1, an example user interface 200 for vehicle launch control according to the principles of the present disclosure is illustrated. The user interface 200 could be displayed by and interacted by the driver, for example, using the user interface 160 (e.g., a touch display of an infotainment system). As shown, the user interface 200 is titled "VEHICLE LAUNCH SETTINGS" and could be displayed in response to, for example, a driver selection of a vehicle launch settings button (not shown). The user interface 200 displays information relative to a set of launch torque curves (A-E). This information could include, for example, an illustration of each launch torque curve on a plot 204 with respect to time, the x-axis, and engine torque (e.g., a percentage between minimum and maximum torque generated by the engine 104), the y-axis. The driver is able to select one of the launch torque curves using bottom buttons 208a-208f. As shown, the driver has selected launch torque curve B using button 208b, which is highlighted or illuminated. It will be appreciated that there could be any suitable number of possible launch torque curves, as illustrated by button 208f (" . . . ") which could be selected to bring up additional launch torque curve options and the relative information (e.g., engine torque vs. time).

Each launch torque curve could have a corresponding label 212a-212e, and it will be appreciated that these labels 212a-212e or other suitable control mechanisms could be utilized such that the driver is able to manipulate or change the launch torque curves. However, it will also be appreciated that these launch torque curves could be predetermined and preloaded, and thus may not be modifiable by the driver. As mentioned above, while five predetermined and preloaded launch torque curves are illustrated and described herein, it will be appreciated that the set of launch torque curves could include any suitable number of one or more launch torque curves. In one exemplary implementation, the launch torque curves A-E correspond to different levels of spark/ignition timing retardation of the engine 104. For example, curve A could be zero degrees spark retardation, curve B could be one degree spark retardation, curve C could be two degrees of spark retardation, and so on and so forth. It will be appreciated, however, that this is merely one example of how different launch torque curves could be defined and that any other suitable method could be utilized. More particularly, each launch torque curve could define specific levels of airflow, fueling, and spark timing to provide the varying level of torque output.

Figure 3:
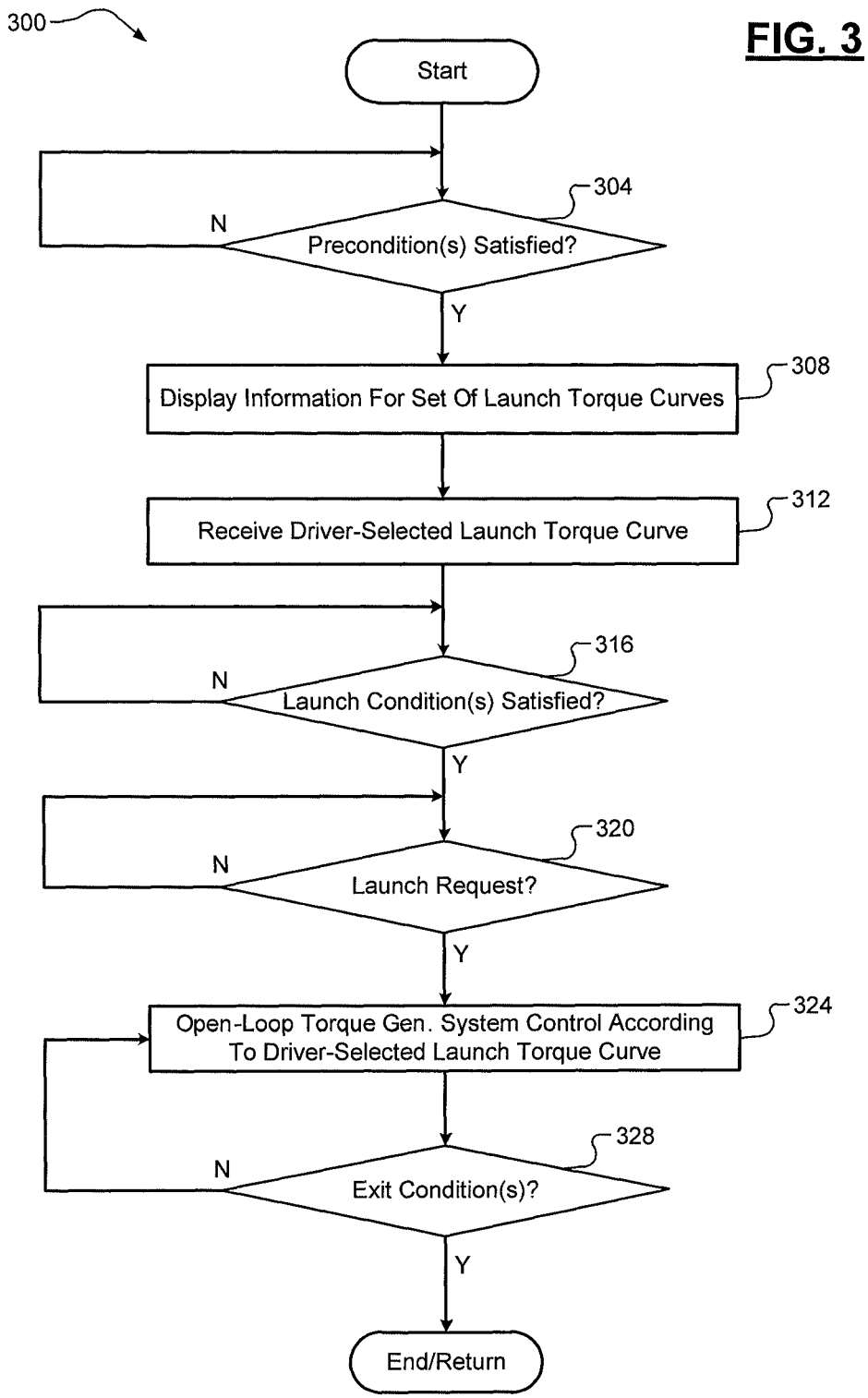
FIG. 3 is a flow diagram of an example vehicle launch control method that utilizes driver-selectable launch torque curves for open-loop control of engine torque control irrespective of wheel slip according to the principles of the present disclosure.

Referring now to FIG. 3 and with continued reference to FIGS. 1-2, a flow diagram of an example launch control method 300 according to the principles of the present disclosure is illustrated. While the method 300 is described as being implemented by the controller 136 of vehicle 100, it will be appreciated that the method 300 could be implemented by any suitable vehicle controller or control system that is capable of open-loop engine torque control. At 304, the controller 136 determines whether a set of one or more preconditions is satisfied. This could include, for example only, the engine 104 being on/running and there being no vehicle malfunctions detected. When the set of precondition(s) is satisfied, the method 300 proceeds to 308. Otherwise the method 300 ends or returns to 304. At 308, the controller 136 commands the user interface 160 to display information to the driver relative to the set of launch torque curves. For example only, this could be the displaying of user interface 200. At 312, the controller 136 receives a driver-selected launch torque curve. For example only, this could be the driver-selection of launch torque curve B from user interface 200. At 316, the controller 136 determines whether a set of one or more launch conditions is satisfied. This could include, for example only, the vehicle 100 being stationary or the vehicle speed less than or equal to a vehicle speed threshold (e.g., approximately zero miles per hour) and the brake pedal 148 being fully-depressed (e.g., to or a fully-depressed position/depression threshold) or the transbrake feature of the transmission 116 being activated.

In other words, the set of launch condition(s) indicate that the vehicle 100 is in a state in which a launch is ready to be performed. When true, the method 300 proceeds to 320. Otherwise, the method 300 ends or returns. At 320, the controller 136 detects a launch request. This could include, for example only, the accelerator pedal 128 being fully-depressed (e.g., to or past a fully-depressed position/depression threshold, indicating a wide-open throttle (WOT) request for the throttle valve 140), which could cause the transbrake feature to deactivate or otherwise release, and the brake pedal 148 being fully-released (e.g., to or past a fully-released position/depression threshold) if it was previously fully-depressed or the clutch pedal 168 being depressed to a clutch pedal position threshold. When the launch request is detected, the method 300 proceeds to 324. Otherwise, the method 300 ends or returns. At 324, the controller 156 performs open-loop torque control of the engine 104 according to the driver-selected launch torque curve and irrespective of wheel slip (e.g., feedback from wheel speed sensors 164). At 328, the controller 156 determines whether one or more exit conditions have been detected. This could include, for example only, the driver backing off the accelerator pedal 128, pushing the brake pedal 148, or any other suitable conditions that would indicate launch control should be suspended. When false, the method 300 returns to 324 and open-loop engine torque control continues. When true, however, the method 300 ends.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A launch control system for a vehicle having a torque generating system, the launch control system comprising:
   a user interface configured to:
      display information relating to a set of launch torque curves, each launch torque curve defining how the torque generating system is to generate drive torque during a finite vehicle launch period defined from a vehicle stop until the vehicle reaches a threshold speed or a vehicle launch timer expires; and receive a driver-selection of one of the set of launch torque curves to obtain a driver-selected launch torque curve; and a controller configured to:
- detect a set of launch conditions comprising one or more vehicle operating conditions indicative of a launch of the vehicle;
- detect a launch request in response to an accelerator pedal of the vehicle being depressed to an accelerator pedal position threshold; and
- after receiving the driver-selected launch torque curve and in response to detecting the set of launch conditions and the launch request, control the launch of the vehicle by performing open-loop control of the drive torque generated by the torque generating system according to the driver-selected launch torque curve and irrespective of wheel slip of the vehicle for a duration of the finite vehicle launch period.

2. The launch control system of claim 1, wherein the controller is configured to perform the open-loop control of the drive torque generated by the torque generating system according to the driver-selected launch torque curve and irrespective of any feedback relative to a driveline of the vehicle.

3. The launch control system of claim 1, wherein the controller is configured to perform the open-loop control of the drive torque generated by the torque generating system according to the driver-selected launch torque curve and without any driver modulation of the accelerator pedal.

4. The launch control system of claim 1, wherein the set of driver-selectable launch torque curves comprises a plurality of predetermined launch torque curves.

5. The launch control system of claim 1, wherein the set of driver-selectable launch torque curves comprises at least one driver-generated or driver-modified launch torque curve.

6. The launch control system of claim 1, wherein the set of launch conditions comprises a speed of the vehicle being less than a threshold and a brake pedal of the vehicle being depressed to a first brake pedal position threshold or a clutch pedal of the vehicle being depressed to a clutch pedal position threshold.

7. The launch control system of claim 6, wherein the launch request further comprises the brake pedal being released to a second brake pedal position threshold.

8. The launch control system of claim 1, wherein the set of launch conditions comprises a speed of the vehicle being less than a threshold and a transmission braking feature of a transmission of the vehicle being active.

9. The launch control system of claim 1, wherein the user interface is a touch display of an infotainment system of the vehicle.

10. The launch control system of claim 1, wherein the user interface is further configured to receive a driver-modification to one of the set of launch torque curves to obtain a different driver-modified launch torque curve, and wherein the driver-selected launch torque curve is the driver-modified launch torque curve.

11. A launch control method for a vehicle having a torque generating system, the launch control method comprising:
- commanding, by a controller of the vehicle, a user interface of the vehicle to display information relating to a set of launch torque curves, each launch torque curve defining how the torque generating system is to generate drive torque during a finite vehicle launch period defined from a vehicle stop until the vehicle reaches a threshold speed or a vehicle launch timer expires;
- receiving, by the controller and via the user interface, a driver-selection of one of the set of launch torque curves to obtain a driver-selected launch torque curve;
- detecting, by the controller, a set of launch conditions comprising one or more vehicle operating conditions indicative of a launch of the vehicle;
- detecting, by the controller, a launch request in response to an accelerator pedal of the vehicle being depressed to an accelerator pedal position threshold; and
- after receiving the driver-selected launch torque curve and in response to detecting the set of launch conditions and the launch request, controlling, by the controller, the launch of the vehicle by performing open-loop control of the drive torque generated by the torque generating system according to the driver-selected launch torque curve and irrespective of wheel slip of the vehicle for a duration of the finite vehicle launch period.

12. The launch control method of claim 11, wherein the performing of the open-loop control of the drive torque generated by the torque generating system according to the driver-selected launch torque curve is irrespective of any feedback relative to a driveline of the vehicle.

13. The launch control method of claim 11, wherein the performing of the open-loop control of the drive torque generated by the torque generating system according to the driver-selected launch torque curve is without any driver modulation of the accelerator pedal.

14. The launch control method of claim 11, wherein the set of driver-selectable launch torque curves comprises a plurality of predetermined launch torque curves.

15. The launch control method of claim 11, wherein the set of driver-selectable launch torque curves comprises at least one driver-generated or driver-modified launch torque curve.

16. The launch control method of claim 11, wherein the set of launch conditions comprises a speed of the vehicle being less than a threshold and a brake pedal of the vehicle being depressed to a first brake pedal position threshold or a clutch pedal being depressed to a clutch pedal position threshold.

17. The launch control method of claim 16, wherein the launch request further comprises the brake pedal being released to a second brake pedal position threshold.

18. The launch control method of claim 11, wherein the set of launch conditions comprises a speed of the vehicle being less than a threshold and a transmission braking feature of a transmission of the vehicle being active.

19. The launch control method of claim 11, wherein the user interface is a touch display of an infotainment system of the vehicle.

20. The launch control method of claim 11, wherein the user interface is further configured to receive a driver-modification to one of the set of launch torque curves to obtain a different driver-modified launch torque curve, and wherein the driver-selected launch torque curve is the driver-modified launch torque curve.

* * * * *